(12) United States Patent
Yan

(10) Patent No.: US 10,310,483 B2
(45) Date of Patent: Jun. 4, 2019

(54) METHOD AND APPARATUS FOR PROTECTING HEAT DISSIPATION FAN OF PROJECTING DEVICE

(71) Applicant: ZTE CORPORATION, Shenzhen, Guangdong Province (CN)

(72) Inventor: Wei Yan, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 227 days.

(21) Appl. No.: 15/325,089

(22) PCT Filed: Oct. 21, 2014

(86) PCT No.: PCT/CN2014/089096
§ 371 (c)(1),
(2) Date: May 19, 2017

(87) PCT Pub. No.: WO2016/004701
PCT Pub. Date: Jan. 14, 2016

(65) Prior Publication Data
US 2017/0261961 A1 Sep. 14, 2017

(30) Foreign Application Priority Data
Jul. 10, 2014 (CN) .......................... 2014 1 0326758

(51) Int. Cl.
*G05B 19/00* (2006.01)
*G05B 19/406* (2006.01)
(Continued)

(52) U.S. Cl.
CPC ......... *G05B 19/406* (2013.01); *F04D 27/001* (2013.01); *F04D 27/008* (2013.01);
(Continued)

(58) Field of Classification Search
CPC ........ G05B 19/406; G05B 2219/34465; H04N 9/3173; H04N 9/3144; G03B 21/14;
(Continued)

(56) References Cited

U.S. PATENT DOCUMENTS 7,568,313 B1     8/2009    Matley
8,909,497 B1 *   12/2014   Shkolnikov ............. G01P 15/00
                                                                     340/573.1
(Continued)

FOREIGN PATENT DOCUMENTS

CN         202646145 U     1/2013
CN         202833293 U     3/2013
(Continued)

*Primary Examiner* — Christopher E. Everett
(74) *Attorney, Agent, or Firm* — Ling Wu; Stephen Yang; Ling and Yang Intellectual Property

(57) ABSTRACT

Disclosed is a method for protecting a heat dissipation fan of a projecting device, including: when a heat dissipation fan is in a working state, obtaining fall-related information when a projecting device is falling; determining fall-related information of the heat dissipation fan according to the fall-related information of the projecting device; terminating the operation of the heat dissipation fan when the fall state information of the heat dissipation fan is in a falling state; resuming the operation of the heat dissipation fan when the fall state information of the heat dissipation fan is that the fall ends. Further disclosed is an apparatus for protecting a heat dissipation fan of a projecting device, corresponding to the method.

6 Claims, 2 Drawing Sheets

(51) Int. Cl.
*G03B 21/00* (2006.01)
*F04D 27/00* (2006.01)
*G03B 21/16* (2006.01)
*G03B 21/14* (2006.01)
*H04N 9/31* (2006.01)

(52) U.S. Cl.
CPC .............. *G03B 21/00* (2013.01); *G03B 21/14* (2013.01); *G03B 21/16* (2013.01); *H04N 9/3144* (2013.01); *H04N 9/3173* (2013.01); *G05B 2219/34465* (2013.01)

(58) Field of Classification Search
CPC ....... G03B 21/16; G03B 21/00; F04D 27/008; F04D 27/001
See application file for complete search history.

(56) References Cited

U.S. PATENT DOCUMENTS

| | | | | |
|---|---|---|---|---|
| 2005/0046804 | A1* | 3/2005 | Akutsu | H04N 5/74 353/70 |
| 2006/0070439 | A1* | 4/2006 | Kwon | G01P 15/00 73/488 |
| 2006/0136168 | A1* | 6/2006 | Nakamura | G01P 15/0891 702/141 |
| 2006/0152842 | A1* | 7/2006 | Pasolini | G01P 15/0891 360/75 |
| 2006/0268447 | A1* | 11/2006 | Liao | G01P 15/0891 360/75 |
| 2007/0030159 | A1* | 2/2007 | Stoev | G01P 15/0891 340/669 |
| 2007/0107068 | A1* | 5/2007 | Kelley | G01P 15/0891 726/34 |
| 2007/0120528 | A1* | 5/2007 | Burgan | H02J 7/0029 320/114 |
| 2009/0033877 | A1* | 2/2009 | Choi | G03B 21/26 353/36 |
| 2009/0205406 | A1* | 8/2009 | Tachibana | G01P 15/0891 73/12.06 |
| 2010/0142154 | A1 | 6/2010 | Collet et al. | |
| 2011/0261482 | A1* | 10/2011 | Hirata | G11B 19/042 360/74.1 |
| 2011/0306388 | A1 | 12/2011 | Osaka et al. | |
| 2012/0044467 | A1 | 2/2012 | Nakayama et al. | |
| 2013/0257582 | A1 | 10/2013 | Rothkopf et al. | |

FOREIGN PATENT DOCUMENTS

| | | |
|---|---|---|
| CN | 103207955 A | 7/2013 |
| JP | 2006349790 A | 12/2006 |
| JP | 2008-015390 A | 1/2008 |
| JP | 2009-133952 A | 6/2009 |
| JP | 2010-226683 A | 10/2010 |
| WO | WO2009070862 A1 | 6/2009 |

\* cited by examiner

METHOD AND APPARATUS FOR PROTECTING HEAT DISSIPATION FAN OF PROJECTING DEVICE

TECHNICAL FIELD

The present application relates to the field of projecting devices, and more particularly, to a method and apparatus for protecting a heat dissipation fan of a projecting device.

BACKGROUND

With the development of projecting technology, projecting device is evolving in the direction of portability and practicability, and more and more portable projecting devices have appeared in the market. Micro projecting device is constantly upgrading its projection resolution and brightness at the same time of reducing its volume, making its performances gradually closing to that of the traditional projecting device in terms of resolution, brightness, projection area and projection distance.

The resolution and brightness of the portable projecting device increases, at the same time, power consumption increases. In this respect, a heat dissipation fan with larger diameter and more power is needed theoretically to effectively dissipate heat of the projecting device. If a heat dissipation fan with larger diameter and more power is used, its anti-falling capability is significantly reduced at work due to the increase in diameter and speed, likely to damage the heat dissipation fan.

Since the problem of the anti-falling capability of the heat dissipation fan cannot be effectively solved, currently the portable projecting device mainly uses a low-power heat dissipation fan within the projecting device plus an auxiliary heat dissipation device for heat dissipation, which increases the volume of the projecting device and is not conducive to portability and usage.

SUMMARY

In order to solve the abovementioned problem, the embodiment of the present document provides a method and apparatus for protecting a heat dissipation fan of a projecting device, to reduce the risk of damaging the heat dissipation fan when the projecting device falls and to improve the portability of the projecting device.

The embodiment of the present application provides a method for protecting a heat dissipation fan of a projecting device, including:

when the projecting device is in a working state, real-time obtaining fall-related information when the projecting device is falling;

determining fall state information of the heat dissipation fan according to the fall-related information of the projecting device;

when the fall state information of the heat dissipation fan is in a falling state and the heat dissipation fan is in a working state, terminating the operation of the heat dissipation fan.

Alternatively, said real-time obtaining the fall-related information when the projecting device is falling specifically includes:

obtaining time information and acceleration information in real time via a two-axis or three-axis acceleration sensor when the projecting device is falling.

Alternatively, said determining fall state information according to the fall-related information specifically includes:

when the acceleration of the projecting device obtained through the acceleration sensor reaches a first threshold and that the duration reaches 200 milliseconds is determined according to the time information, determining that the fall state information is the falling state;

the first threshold is a product of any selected value with an absolute value less than 0.2 and the gravitational acceleration.

Alternatively, the method further includes:

when the gravitational acceleration of the projecting device obtained through the acceleration sensor is within a second threshold range and that the duration reaches any selected value between 1 and 2 seconds is determined according to the time information, determining that the fall state information is a falling static state;

when the fall state information is the falling static state and the projecting unit is projecting, turning on the heat dissipation fan;

the second threshold is an interval value of the products of the gravitational acceleration and 0.8 and 1.2 respectively.

Alternatively, before that, the method further includes obtaining working states of the projecting unit and the heat dissipation fan.

In another aspect, the embodiment of the present application further provides an apparatus for protecting a heat dissipation fan of a projecting device, including: an obtaining unit and a processing unit; herein, the obtaining unit is arranged to, when a projecting device is in a working state, real-time obtain fall-related information when the projecting device is falling;

the processing unit is arranged to determine fall state information of the heat dissipation fan according to the fall-related information of the projecting device; when the fall state information of the heat dissipation fan is the falling state and the heat dissipation fan is in the working state, terminating the operation of the heat dissipation fan.

Alternatively, the obtaining unit consists of a two-axis or three-axis acceleration sensor, and is arranged to real-time obtain time information and acceleration information when the projecting device is falling.

Alternatively, the processing unit includes: a fall state information analyzing module and a processing module; wherein, the fall state information analyzing module is arranged to, when the acceleration of the projecting device obtained through the acceleration sensor reaches a first threshold and that the duration reaches 200 milliseconds is determined according to the time information, determine that the fall state information is the falling state;

the processing module is arranged to: terminate the operation of the heat dissipation fan when the fall state information is the falling state;

the first threshold is the product of any selected value with an absolute value less than 0.2 and the gravitational acceleration.

Alternatively, the fall state information analyzing module is further arranged to: determine that the fall state information is the falling static state when the gravitational acceleration of the projecting device obtained through the acceleration sensor is within a second threshold range and that the duration reaches any selected value between 1 and 2 seconds is determined according to the time information; the processing module is further arranged to, when the fall state information is the falling static and the projecting unit is projecting, turn on the heat dissipation fan;

the second threshold is an interval value of the products of the gravitational acceleration and 0.8 and 1.2 respectively.

Alternatively, the apparatus further includes a working state sensing unit of a projecting unit and a heat dissipation fan, arranged to obtain working states of the projecting unit and the heat dissipation fan.

The embodiment of the present document further provides a computer program comprising program instructions which, when executed by a projecting device, make the projecting device to execute the abovementioned method.

The embodiment of the present document further provides a computer readable storage medium carrying the abovementioned computer program.

Through the embodiment of the present document, the fall state information of a heat dissipation fan can be obtained in real time, and the operation of the heat dissipation fan of the projecting device that is judged to be in the falling state is terminated, so as to avoid the heat dissipation fan from being damaged during the falling since the anti-falling capability of the heat dissipation fan is reduced in the working state, so that a heat dissipation fan with larger diameter and more power can be applied to the projecting device; after the fall stops, the heat dissipation fan of the projecting device is turned on to continue to provide heat dissipation of the projecting device.

BRIEF DESCRIPTION OF THE DRAWINGS

The accompanying drawings are provided for further understanding of the technical scheme of the present application, form a part of the specification, and are used to explain the technical scheme of the present application together with the embodiments of the present application, and are not construed as limiting the technical scheme of the present application.

PREFERRED EMBODIMENTS OF THE DOCUMENT

Hereinafter, in conjunction with the accompanying drawings, embodiments of the present application will be described in detail. It should be noted that, in the case of no conflict, embodiments and features in the embodiments of the present application may be arbitrarily combined with each other.

Figure 1:
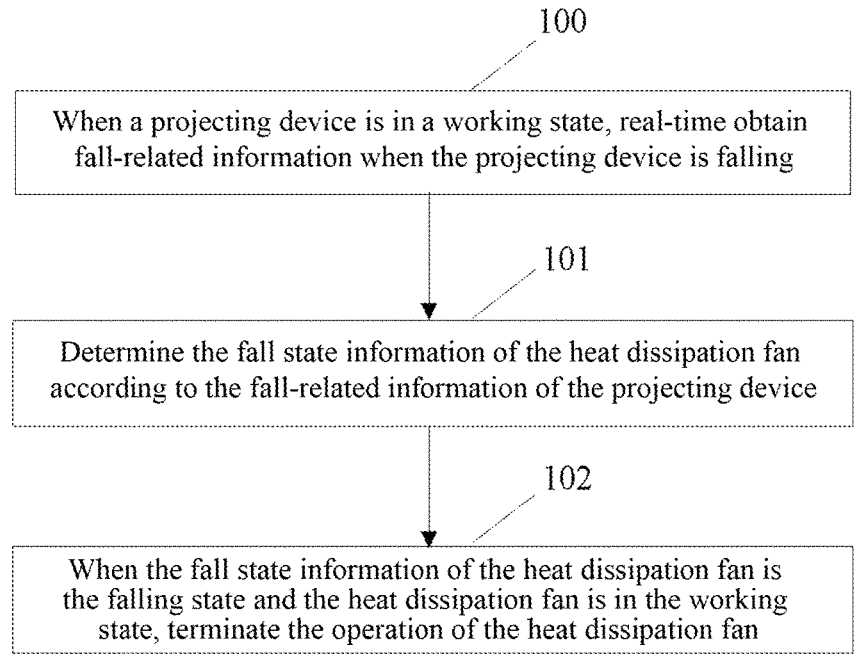
FIG. 1 is a flow chart of a method for protecting a heat dissipation fan of a projecting device in accordance with an embodiment of the present document.

FIG. 1 is a flow chart of the method for protecting a heat dissipation fan of a projecting device in accordance with an embodiment of the present document, and as shown in FIG. 1, it includes:

in step 100, when the projecting device is in the working state, it is to real-time obtain fall-related information when the projecting device is falling.

In this step, said real-time obtaining the fall-related information when the projecting device is falling includes:

real-time obtaining time information and acceleration information when the projecting device is falling via a two-axis or three-axis acceleration sensor.

In step 101, it is to determine the fall state information of the heat dissipation fan according to the fall-related information of the projecting device.

Said determining the fall state information of the heat dissipation fan in this step includes:

when the acceleration of the projecting device obtained through the acceleration sensor reaches a first threshold and that the duration reaches 200 milliseconds is determined according to the time information, determining that the fall state information is the falling state;

the first threshold is the product of any selected value with an absolute value less than 0.2 and a gravitational acceleration.

It should be noted that, the gravitational acceleration is the acceleration that an object gets due to the role of gravity. The acceleration is a ratio of the speed change value to the time that this change takes, and is a physical quantity describing the changing speed of the speed of an object. In addition, the selection of the first threshold is based on the actual application environment. The selections of the second threshold and the duration when the fall state is determined as falling static in the subsequent steps are the same as the selection of the first threshold, and should be determined with combination of practical applications. Herein the practical application environments include altitude, usage environment of the projecting device, and anti-falling requirements of the projecting device.

In step 102, when the fall state information of the heat dissipation fan is the falling state and the heat dissipation fan is in the working state, it is to terminate the operation of the heat dissipation fan.

Before this step, it may further include, obtaining working states of the projecting unit and the heat dissipation fan.

It should be noted that the projecting unit and the heat dissipation unit are respectively two units of the projecting device, and the projecting unit is provided for projecting to play the multimedia information and the heat dissipation unit is for dissipating heat of the projecting unit. The working states of the projecting unit and the heat dissipation fan can be directly obtained by obtaining the working signal in the switch or the circuit, and the method for obtaining the working state is a conventional technique well known to those skilled in the art and will not be repeated here.

The method of the present embodiment may further include: determining that the fall state information is the falling static state when the gravitational acceleration of the projecting device obtained through the acceleration sensor is within a second threshold range and that the duration reaches any selected value between 1 and 2 seconds is determined according to the time information, determining that the fall state information is a falling static state;

when the fall state information is the falling static and the projecting unit is projecting, turning on the heat dissipation fan;

the second threshold is an interval value between the products of the gravitational acceleration and 0.8 and 1.2 respectively.

Through the embodiment of the present document, the fall state information of a heat dissipation fan can be obtained in real time, and the operation of the heat dissipation fan of the projecting device that is judged to be in the falling state is terminated, so as to avoid the heat dissipation fan from being damaged during the falling since the anti-falling capability of the heat dissipation fan is reduced in the working state, so that a heat dissipation fan with larger diameter and more power can be applied to the projecting device; after the fall stops, the heat dissipation fan of the projecting device is turned on to continue to provide heat dissipation of the projecting device.

Figure 2:
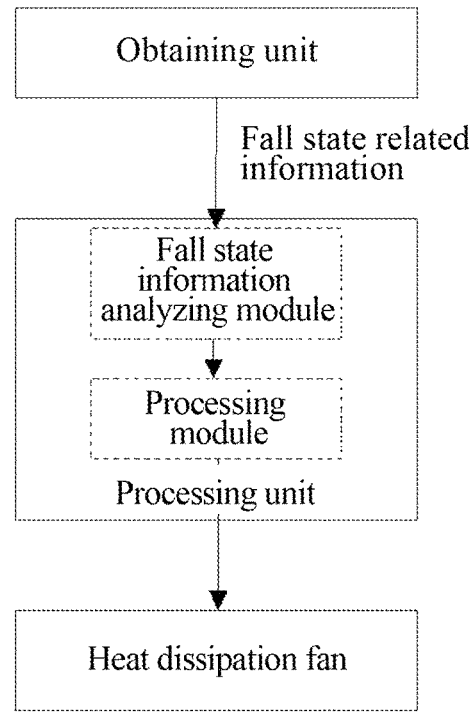
FIG. 2 is a block diagram of an apparatus for protecting a heat dissipation fan of a projecting device in accordance with an embodiment of the present document.

FIG. 2 is a block diagram of the apparatus for protecting a heat dissipation fan of a projecting device, and as shown in FIG. 2, it includes: an obtaining unit and a processing unit; herein, the obtaining unit is arranged to, real-time obtain fall-related information when the projecting device is falling when a projecting device is in a working state;

the obtaining unit consists of a two-axis or three-axis acceleration sensor, and is arranged to real-time obtain time information and acceleration information when the projecting device is falling.

The processing unit is arranged to, determine the fall state information of the heat dissipation fan according to the fall-related information of the projecting device; and terminate the operation of the heat dissipation fan when the fall state information of the heat dissipation fan is the falling state and the heat dissipation fan is in the working state.

The processing unit includes: a fall state information analyzing module and a processing module; herein, the fall state information analyzing module is arranged to, when the acceleration of the projecting device obtained through the acceleration sensor reaches a first threshold and that the duration reaches 200 milliseconds is determined according to the time information, determine that the fall state information is the falling state;

the processing module is arranged to terminate the operation of the heat dissipation fan when the fall state information is the falling state and the heat dissipation is in the working state;

the first threshold is the product of any selected value with an absolute value less than 0.2 and a gravitational acceleration.

The fall state information analyzing module is further arranged to: determine that the fall state information is the falling static state when the gravitational acceleration of the projecting device obtained through the acceleration sensor is within a second threshold range and that the duration reaches any selected value between 1 and 2 seconds is determined according to the time information;

the processing module is further arranged to, when the fall state information is the falling static and the projecting unit is projecting, turn on the heat dissipation fan; herein the second threshold is an interval value between the products of the gravitational acceleration and 0.8 and 1.2 respectively.

The apparatus of the present embodiment further includes a working state sensing unit of a projecting unit and a heat dissipation fan, arranged to obtain the working states of the projecting unit and the heat dissipation fan.

Figure 3:
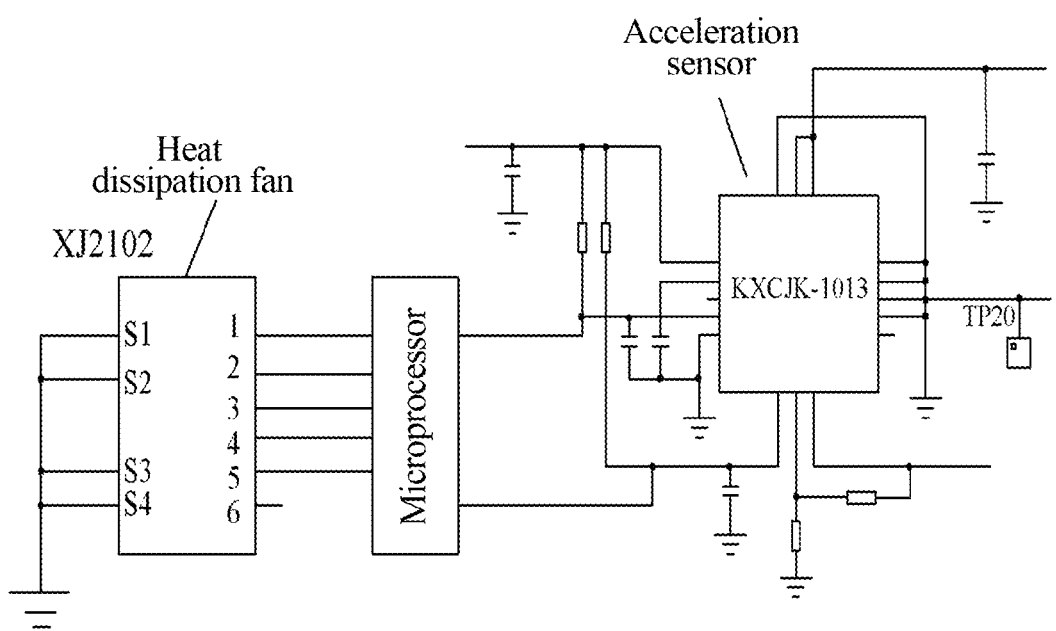
FIG. 3 is a circuit block diagram of an exemplary apparatus for protecting a heat dissipation fan of a projecting device in accordance with the present document.

FIG. 3 is a circuit block diagram of an exemplary apparatus for protecting a heat dissipation fan of a projecting device in accordance with the present document. As shown in FIG. 3, the acceleration sensor is arranged to real-time obtain the time information and the acceleration information when the projecting device is falling. In FIG. 3, the acceleration sensor uses the three-axis acceleration sensor provided by Kionix whose model is KXCJX-1013, in addition, the three-axis acceleration sensor provided by ST whose model is LIS3DHTR may also be used.

The microprocessor can achieve the function of the processing unit in FIG. 2, and can be implemented via the Qualcomm intelligent terminal chip or the 4-core microprocessor integrated in MSM8974Aa.

Although the embodiments disclosed herein are as above, the content is for ease of understanding the present application and is not intended to limit the present application, such as the method for recording voice and the method for obtaining call signal in the embodiments of the present document. Those skilled in the art can make various modifications and changes in the form and details of implementation without departing from the spirit and scope disclosed by the present application, although the scope of the present patent application should be defined by the scope of the appended claims.

Those ordinarily skilled in the art can understand that all or some of the steps of the abovementioned embodiments may be implemented using a computer program process, and the computer program may be stored in a computer-readable storage medium and executed on an appropriate hardware platform (such as a system, equipment, device, component, and so on), and during the execution, it comprises one of the steps of the method embodiment or a combination thereof.

Alternatively, all or some of the steps of the abovementioned embodiments can also be implemented with integrated circuits, these steps may be made into individual integrated circuit modules respectively, or some of the modules or steps can be made into a single integrated circuit module to implement. Therefore, the present document is not limited to any specific combination of hardware and software.

Each device/functional module/functional unit in the abovementioned embodiments may be implemented with universal computing devices, and they can be concentrated on a single computing device or distributed on a network composed of a plurality of computing devices.

When each device/functional module/functional unit in the abovementioned embodiments is implemented in the form of software functional module and sold or used as an individual product, they may be stored in a computer readable storage medium. The abovementioned computer-readable storage medium may be a read-only memory, magnetic or optical disk, or the like.

Within the technical scope disclosed in the present document, anyone familiar with the technical field of the art can easily think of changes or replacements that shall fall within the protection scope of the present document. Therefore, the protection scope of the present document should be the protection scope of the claims.

INDUSTRIAL APPLICABILITY

Through the embodiment of the present document, the fall state information of a heat dissipation fan can be obtained in real time, and the operation of the heat dissipation fan of the projecting device that is judged to be in the falling state is terminated, so as to avoid the heat dissipation fan from being damaged during the falling since the anti-falling capability of the heat dissipation fan is reduced in the working state, so that a heat dissipation fan with larger diameter and more power can be applied to the projecting device; after the fall stops, the heat dissipation fan of the projecting device is turned on to continue to provide heat dissipation of

What is claimed is:

1. A method for protecting a heat dissipation fan of a projecting device, comprising:

when the projecting device is in a working state, obtaining time information and acceleration information in real time via a two-axis or three-axis acceleration sensor when the projecting device is falling;

when the acceleration of the projecting device obtained through the acceleration sensor reaches a first threshold and that the duration reaches 200 milliseconds is determined according to the time information, determining that fall state information is a falling state, wherein the first threshold is a product of any selected value with an absolute value less than 0.2 and a gravitational acceleration; or when the acceleration of the projecting device obtained through the acceleration sensor is within a second threshold range and that the duration reaches any selected value between 1 and 2 seconds is determined according to the time information, determining that the fall state information is a falling static state, wherein the second threshold is an interval value between products of the gravitational acceleration and 0.8 and 1.2 respectively;

when the fall state information of the heat dissipation fan is in the falling state and the heat dissipation fan is in a working state, terminating an operation of the heat dissipation fan;

when the fall state information is in the falling static state and the projecting unit is projecting, turning on the heat dissipation fan.

2. The method of claim 1, wherein, before real-time obtaining the fall-related information when the projecting device is falling, the method further comprises obtaining working states of the projecting unit and the heat dissipation fan.

3. A computer program, comprising program instructions which, when executed by a projecting device, enable the projecting device to execute the method of claim 1.

4. A non-transitory computer readable storage medium, carrying the computer program of claim 3.

5. An apparatus for protecting a heat dissipation fan of a projecting device, comprising: an obtaining unit and a processing unit; wherein, the obtaining unit consists of a two-axis or three-axis acceleration sensor, and is arranged to, when the projecting device is in a working state, real-time obtain time information and acceleration information when the projecting device is falling;

the processing unit is arranged to determine fall state information of the heat dissipation fan according to the fall-related information of the projecting device; wherein, the processing unit comprises: a fall state information analyzing module and a processing module; wherein, the fall state information analyzing module is arranged to, determine that the fall state information is a falling state when the acceleration of the projecting device obtained through the acceleration sensor reaches a first threshold and that a duration reaches 200 milliseconds is determined according to the time information; determine that the fall state information is a falling static state when the gravitational acceleration of the projecting device obtained through the acceleration sensor is within a second threshold range and that the duration reaches any selected value between 1 and 2 seconds is determined according to the time information;

wherein the first threshold is a product of any selected value with an absolute value less than 0.2 and a gravitational acceleration; the second threshold is an interval value between the products of the gravitational acceleration and 0.8 and 1.2 respectively;

the processing module is arranged to: terminate an operation of the heat dissipation fan when the fall state information is the falling state and the heat dissipation fan is in the working state; or turn on the heat dissipation fan when the fall state information is the falling static state and the projecting unit is projecting.

6. The apparatus of claim 5, wherein, the apparatus further comprises a working state sensing unit of a projecting unit and a heat dissipation fan, arranged to obtain working states of the projecting unit and the heat dissipation fan.

* * * * *